INVENTOR.
RICHARD C. HEYSER
BY
Lindenberg & Freilich
ATTORNEYS

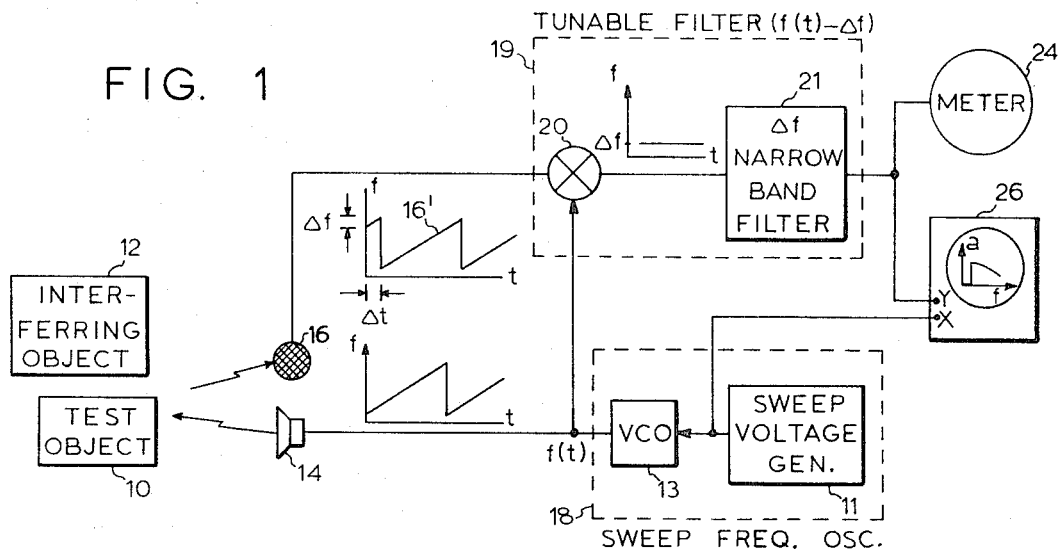
FIG. 1
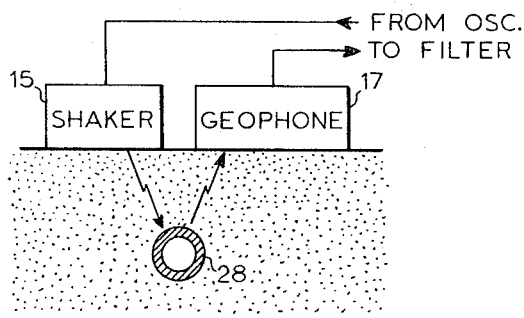
FIG. 2A
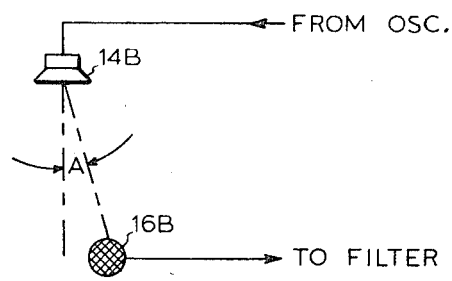
FIG. 2B
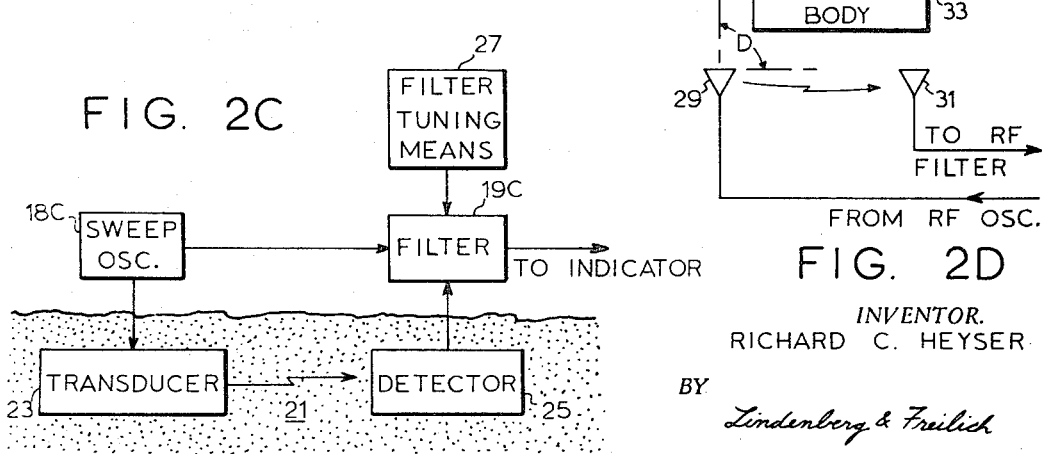
FIG. 2C
FIG. 2D
INVENTOR.
RICHARD C. HEYSER Sept. 9, 1969    R. C. HEYSER    3,466,652
TIME DELAY SPECTROMETER
Filed Jan. 15, 1968    3 Sheets-Sheet 2

United States Patent Office 3,466,652
Patented Sept. 9, 1969

3,466,652
TIME DELAY SPECTROMETER
Richard C. Heyser, Tujunga, Calif., assignor to California Institute of Technology, Pasadena, Calif., a corporation of California
Filed Jan. 15, 1968, Ser. No. 697,824
Int. Cl. G01s 9/23
U.S. Cl. 343—14     15 Claims

ABSTRACT OF THE DISCLOSURE

Apparatus for measuring the amount of sound or electromagnetic radiation from a test object at various frequencies while the test object is in an environment containing radiation reflecting objects whose output could easily be confused with output from the test object. In one application for measuring sound reflections from a test object, the apparatus comprises a loudspeaker driven by a sweep frequency oscillator and a microphone whose output is filtered by a sweep frequency filter. The passband frequency of the filter follows the frequency of the oscillator by a delay equal to the time required for sound to travel from the loudspeaker directly to the object and directly back to the microphone. Accordingly, the filter is always tuned to pass the frequency of sound waves following this direct path, and to rejection sound waves which arrive at a later time when the filter has already passed on to a new frequency.

BACKGROUND OF THE INVENTION

This invention relates to apparatus and methods for measuring the spectral response of an object.

It is often necessary to measure the amount of radiation emanating from a body at various frequencies. For example, the output of a loudspeaker at various frequencies, or the acoustical reflection or transmission characteristics of a door or other object at various frequencies must often be determined. It might appear that the acoustical output of an object could be determined by energizing it with a sine wave at one frequency and measuring the sound radiation at a location near the object, repeating this procedure for various frequencies within the band of interest. However, the object is generally surrounded by many other objects which reflect the sound waves and prevent the determination of the output of the particular object under investigation.

Special anechoic test chambers have been constructed for providing an environment free of extraneous reflecting objects, for testing a single object. However, these facilities are expensive, particularly in the case of anechoic chambers for electromagnetic radiation such as radio waves. Furthermore, there are many situations where the characteristics of an object in a particular environment must be measured, where an anechoic test area cannot be used. For example, the object may comprise a wall area of an auditorium, and it may be desired to measure the reflection characteristics of that wall independently of the floor, ceiling or other wall areas.

OBJECTS AND SUMMARY OF THE INVENTION

One object of the present invention is to provide apparatus which measures the acoustical characteristics of an object or area located at a predetermined distance.

Another object of the invention is to provide apparatus for measuring the amplitude of radiation from an object at various frequencies.

Still another object of the invention is to provide apparatus for measuring the phase shift of radiation from an object at various frequencies.

In accordance with the present invention, there is provided apparatus for measuring the radiation from a test body by energizing it to produce radiation which varies rapidly in frequency. A detector is located a fixed distance from the test body. The detector has a narrow passband filter whose passband frequency tracks the frequency of radiation at the test body. The filter passes only that radiation which is received directly from the test body. This occurs because the passband of the filter reaches the frequency of radiation which previously emerged from the test body at the same time as the radiation, traveling through the air or other medium, reaches the detector and filter. Radiation reflected or otherwise made to emerge from any other object in the environment takes a shorter or longer path and arrives at a time when the filter is not tuned to pass it.

In one application of the invention, the response of a loudspeaker is tested in an ordinary room containing sound reflecting surfaces, by energizing the loudspeaker with signals from a sweep frequency oscillator. A microphone is positioned a fixed distance from the loudspeaker to detect sound from it. The output of the microphone is passed through a tunable bandpass filter. The filter is tuned or driven to track the frequency of the sweep frequency oscillator, the offset in tracking being equal to the time required for sound to travel from the loudspeaker through the air directly to the microphone. Thus, when the sound waves of a particular frequency emerging from the loudspeaker reach the microphone, the filter is tuned to that frequency. Sound reflected from objects in the room reach the microphone at a later time when the filter is tuned to a different frequency, and they do not pass through the filter. The amplitude of the filter output can be displayed as a function of the frequency of the oscillator at each instant, to show the spectral response of the loudspeaker.

The invention can be used to measure the spectral response of a passive test object in an environment of other objects by projecting radiation at the objects and measuring the amplitude of radiation emerging from just the test object. For example, it may be desired to measure the acoustical reflection or transmission coefficients of a door at various frequencies when the door is in place. This requires that reflections or transmissions from the sealing areas around the door be eliminated. In accordance with this invention, a loudspeaker and microphone are set up on directly opposite sides of the door to measure sound transmission through it. The loudspeaker is energized by a sweep frequency oscillator and the microphone output is filtered by a tunable filter. The passband of the filter is offset from the oscillator so that the filter reaches a previous oscillator frequency after a delay equal to the transit time of sound directly from the loudspeaker to the door and then to the microphone. The sweep is fast enough and the passband narrow enough to eliminate sound taking a longer path, such as a path passing through the seal around the door.

The invention can be used to detect objects such as pipes lying in the ground at any particular depth, to detect defects in materials at particular depths, and in many other applications. Furthermore, electromagnetic radiation may be used in the same manner as sound radiation, by replacing a loudspeaker and microphone by antennas.

In one embodiment of the invention, the sweep frequency oscillator comprises a linear voltage controlled oscillator which is driven by a circuit that generates ramp voltages. The output of the sweep frequency oscillator, whose frequency varies at a constant rate, is delivered to a loudspeaker directed at a test object. The received radiation is detected by a microphone. The output of the microphone is delivered to a multiplier or modulator circuit which also receives the output of the sweep frequency oscillator. The output of the multiplier is equal to the difference in frequency between the transmitted and received radiation. This difference frequency is constant for a given radiation path.

The output of the multiplier is delivered to a narrow band filter, whose center frequency is equal to that difference frequency which is obtained for sound waves following a particular path. The filter output is rectified and delivered to the Y or vertical input of an oscilloscope for indicating the amplitude of the filtered signals at every instant. The X or horizontal sweep of the oscilloscope is driven by the same ramp voltage which drives the variable frequency oscillator. The oscilloscope shows the amplitude response to the object being tested at each frequency.

The novel features of the invention are set forth with particularity in the appended claims. The invention will best be understood from the following description when read in conjunction with the accompanying drawings.

BRIEF DESCRIPTION OF THE DRAWINGS

FIGURE 1 is a simplified block diagram of a time delay spectrometer constructed in accordance with the invention;

FIGURES 2A through 2D illustrate several applications of the invention;

DESCRIPTION OF THE PREFERRED EMBODIMENTS

Figure 3:
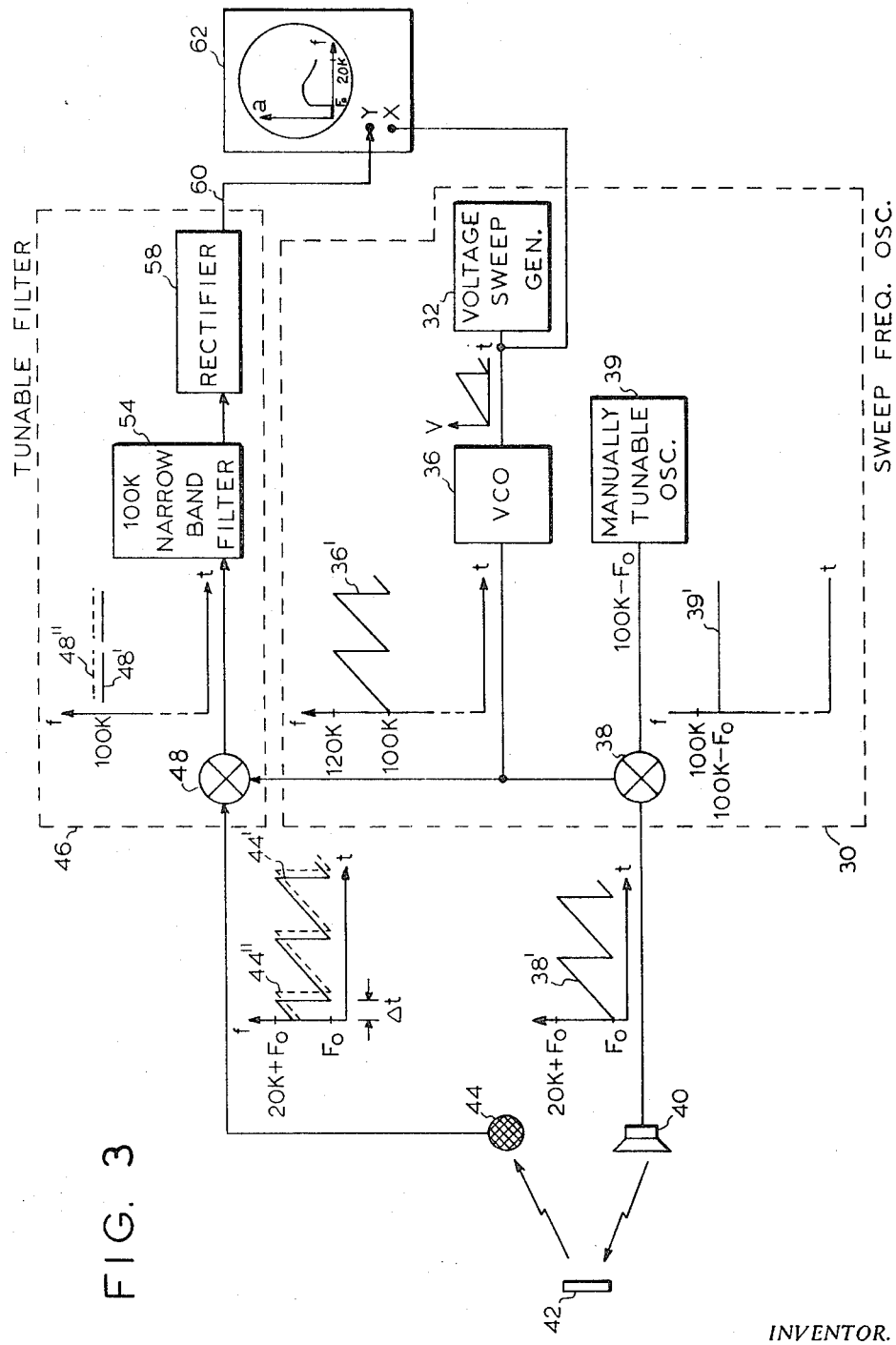
FIGURE 3 is a more detailed block diagram view of a time delay spectrometer of the type shown in FIGURE 1.

FIGURE 1 illustrates a simplified time delay spectrometer, showing its principles of operation. The apparatus is used for determining the coefficient of reflection at various frequencies of a test object 10 which is surrounded by various interfering objects, one of which is shown at 12. The reflection characteristics of the test object 10 are determined by generating sound waves of various frequencies with a loudspeaker 14. The sound waves reflected by both objects 10 and 12 are received by a microphone 16. In order to measure the reflection characteristics of the test object 10, it is necessary to differentiate the radiation it reflects from the radiation reflected by other objects such as interfering object 12.

In accordance with the present invention, sound waves which do not represent direct reflections from the test object are differentiated by the fact that they arrive at a different time (generally later) from the sound waves received from the test object. The manner by which the radiation which traverses a shorter or longer path than the radiation to be detected is excluded is a principal novel feature of the invention.

The loudspeaker 14 is energized by the output of a sweep frequency oscillator 18 whose frequency varies continuously with time and at a constant rate. The oscillator 18 may contain a sweep voltage generator 11 which energizes a voltage controlled oscillator 13. The output of the sweep frequency oscillator begins at a low level such as 200 Hz. and increases to a high level such as 20 kHz. during a one second interval, and then begins again at 200 Hz. The time required for the sound waves to travel from the loudspeaker 14 to the tested object 10 and then to the microphone 16 is a period $\Delta t$; in one application, this period may be on the order of 4 milliseconds during which time the oscillator output frequency changes by approximately 80 Hz. Accordingly, the output of the microphone 16 includes a signal 16' representing reflections of the test object, which tracks the oscillator output frequency with an offset, such as 80 Hz., representing the frequency change during the interval $\Delta t$.

The output of the microphone 16 is delivered to a tunable filter circuit 19 having a narrow passband, the passband center frequency varying with time. The tunable filter 19 comprises a mixer or modulator 20 which mixes the transmitted frequency from oscillator 18 with the output from the microphone. The mixer output includes the difference frequency $\Delta f$ which is equal to the change in frequency of the oscillator output during the interval $\Delta t$ required for sound to pass from the loudspeaker 14 to the test object 10 and then to the microphone 16. Only this difference frequency $\Delta f$ passes through a narrow bandpass filter 21 of the tunable filter circuit. The tunable filter 19 therefore acts as a filter which tracks the sweep oscillator output $f(t)$ by an offset frequency $\Delta f$, i.e., it acts as a filter of a frequency $f(t)-\Delta f$. The output of the filter 19 therefore has an amplitude proportional to the amount of sound reflected from the tested object.

Sound waves reflected from an interfering object 12 travel along a path which is different from the path of waves received from the test object. As a result, waves from the interfering object reach the microphone 16 after a delay of more than $\Delta t$. When these waves arrive at the microphone 16, the tunable filter 20 has already been tuned to a different frequency, so that the reflections from the interfering object do not pass through the filter. Accordingly, they do not affect the output of the filter. In a similar manner, waves traveling directly from the loudspeaker 14 to the microphone 16 arrive too early to pass through the filter and affect its output.

The output of the tunable filter 19 represents the amplitude of sound reflections from the test object, the amplitude at any instant representing the coefficient of reflection for a particular frequency. If a direct current meter 24 with very slow response time (e.g., less than a second for 1 second sweeps) is energized with the filter output, the meter indicates the average coefficient of reflection of the object for the range of frequencies. If it is desired to determine the reflection coefficient for any particular frequency, this can be done by using the filter output to drive the vertical or Y input of an oscilloscope 26. The horizontal or X axis of the oscilloscope is swept in synchronism with the change in frequency of the sweep oscillator 18, as by driving it with the output of the sweep voltage generator 11.

The apparatus of FIGURE 1 can be used in a number of ways in addition to determining the reflection coefficients of a known object. As shown in FIGURE 2A, a sonic transducer such as a vibrator or shaker 15 can be directed into the ground, and a geophone 17 positioned to receive reflected sound waves to locate an object 28 such as a pipe having a known frequency response characteristic. A more precise discrimination between various objects can be made than has been possible heretofore. The approximate velocity of sound in typical ground compositions, water, and other media, is known, and the delay $\Delta t$ can be adjusted for a desired depth in the particular medium.

Another use of the apparatus, illustrated in FIGURE 2B, is to enable the testing of a loudspeaker 14B or other radiating device without the necessity for an anechoic chamber. This can be done by energizing the loudspeaker 14B with the output from the sweep frequency oscillator and adjusting the delay $\Delta t$ to the time required for sound to travel directly from the loudspeaker to a microphone 16B. The angle A between the axis of the loudspeaker and the location of the microphone can be varied to measure off-axis output.

Still another use of the apparatus, indicated in FIGURE 2C, is to measure the velocity of propagation of waves in an unknown medium 21. For example, the type of composition of a ground area is indicated by the velocity of propagation of sound waves of various frequencies. A sonic transducer 23 is driven by a sweep frequency oscillator 18C for introducing sound waves of various frequencies into the ground at one location. A detector 25 is located a predetermined distance from the transducer 23. The output of the detector is delivered to a tunable filter 19C. The passband of the filter is the difference frequency $f(t)-\Delta f$ between the frequency $f(t)$ of the oscillator 18C and an offset frequency $\Delta f$ of a filter tuning means 27. The tuning means 27 can be manually adjusted to vary the offset. The offset frequency $\Delta f$ is slowly increased from a low value, and the amplitude at each frequency is observed on an oscilloscope. The time required for sound to travel the shortest path between the transducer 23 and the detector 25 at various frequencies is indicated by the offset required to obtain a considerable amplitude output for that frequency.

While examples have been given for sound radiation, it should be recognized that the same principles apply to electromagnetic radiation. For radio waves, antennas are substituted for the loudspeaker and microphone, or other sonic transducers, and in many situations higher frequencies are used. FIGURE 2D shows a setup for measuring the output of a transmitting antenna 29 at a particular angle D by detecting the radiation with a receiving antenna 31 positioned at that angle. This can be done in the presence of a reflecting body 33 in the environment.

FIGURE 3 is a more detailed block diagram of a circuit for generating a sweep frequency to energize a transmitter to control a tunable filter. The sweep frequency oscillator 30 comprises a sweep voltage generator 32 that generates ramp voltages. The sweep frequency oscillator also includes a high frequency voltage controlled oscillator, or VCO 36 which generates a sinusoidal output 36' having a frequency linearly proportional to the voltage input thereto. The output of the VCO repeatedly sweeps between a lower frequency, such as 100 kHz. and a higher frequency such as 120 kHz. in a sweep time such as one second, the frequency changing at a constant rate during each sweep.

The output of the VCO 36 is delivered to a mixer circuit 38, where it is modulated by the output of a manually tunable oscillator 39. The manually tunable oscillator 39 has a constant frequency output 39' of a frequency $100k-F_0$. The mixer 38 generates an output 38' having a frequency equal to the difference between the outputs of the VCO 36 and the manually tunable oscillator 38 (the sum frequencies are filtered out by a filter, not shown). The difference frequency sweeps between $F_0$ and $20k+F_0$ in synchronism with the sweep output of the VCO. This difference frequency output 38' is delivered to a loudspeaker 40 to drive it.

The loudspeaker 40 directs its output to an object 42 which reflects some of the sound waves to a microphone 44. The length of the direct path from the loudspeaker 40 to the object 42 and from thence to the microphone 44 is accurately known. During the time $\Delta t$ required to traverse this path, the loudspeaker frequency changes by an amount $\Delta f$ equal to $F_0$ ($F_0$ is chosen to be this value). The output of the microphone 44 is delivered to a turnable filter 46 for passing only those received frequency components which represent reflections from the object 42.

The microphone output is first delivered to a modulator or mixer circuit 48 of the tunable filter the mixer circuit 48 also receives a signal from the VCO 36 to the sweep frequency oscillator. The mixer circuit 48 delivers a signal which contains the difference between the frequencies of its inputs. The portion 48' of this signal which represents reflections from the test object 42 is at a known frequency, such as 100 kHz. This difference signal 48' is passed to a narrow band filter 54 which passes only a very narrow frequency component, such as the 100 kHz. component. The filtered output passes through a rectifier 58 to the tunable filter output 60. The output at 60 has an amplitude at all times proportional to those inputs to microphone 44 which represent reflections from the object 42.

In considering the operation of the circuit of FIGURE 3, the tunable filter 46 acts like a narrow passband filter whose frequency can be varied. An output from the sweep frequency oscillator performs this variation so that the tunable filter passband tracks the frequency of the loudspeaker output by the required offset. This is accomplished in the actual circuit by mixing the transmitted and received frequencies and passing the difference frequency through a constant frequency filter which is set to pass only the required offset frequency.

The output signals of the tunable filter can be viewed on an oscilloscope 62 by connecting the output 60 to the Y, or vertical input of the oscilloscope. The X or horizontal sweep is taken as the voltage output of the voltage sweep generator 32 in the sweep frequency oscillator.

It should be noted that at any given instant, the X axis sweep of the oscilloscope 62 represents the frequency being transmitted, while the Y axis represents the amplitude of the signals transmitted at an earlier time. Because of this offset, the highest frequencies from the test object 42 are received at a time when the oscilloscope begins a new sweep, and the object response to these frequencies cannot be measured. The response at a high frequency can be measured by increasing the maximum frequency within the sweep band, or by sweeping in a reverse direction, that is, by starting each sweep at the highest frequency and decreasing linearly to the lowest frequency.

The rejection of sound radiation from other objects in the environment, by the circuit of FIGURE 3, is based on the different time or arrival of radiation from these other objects. The output of the microphone 44 may contain additional frequency components, such as that shown at 44" which represents radiation following a longer path. This will give rise to a component 48" at the mixer output, which is too high in frequency to pass through the narrow band filter 54. In order to adjust the apparatus to a different radiation path length between the loudspeaker, object and microphone, the output 39' of the manually tunable oscillator is adjusted. The path length for which radiation will be detected varies in direct proportion to the component $F_0$ of the output 39' from the manually tunable oscillator.

While information about the amplitude of radiation from a particular body is useful, information about the phase of radiation from the body is also of importance. Knowledge about the exact phase shift indicates the material at the surface of the test body, or the exact range of the body. For example, a precise determination of the phase shift of reflected radiation can indicate the distance of an object within a small fraction of a wavelength of the highest frequency radiation.

Figure 4:
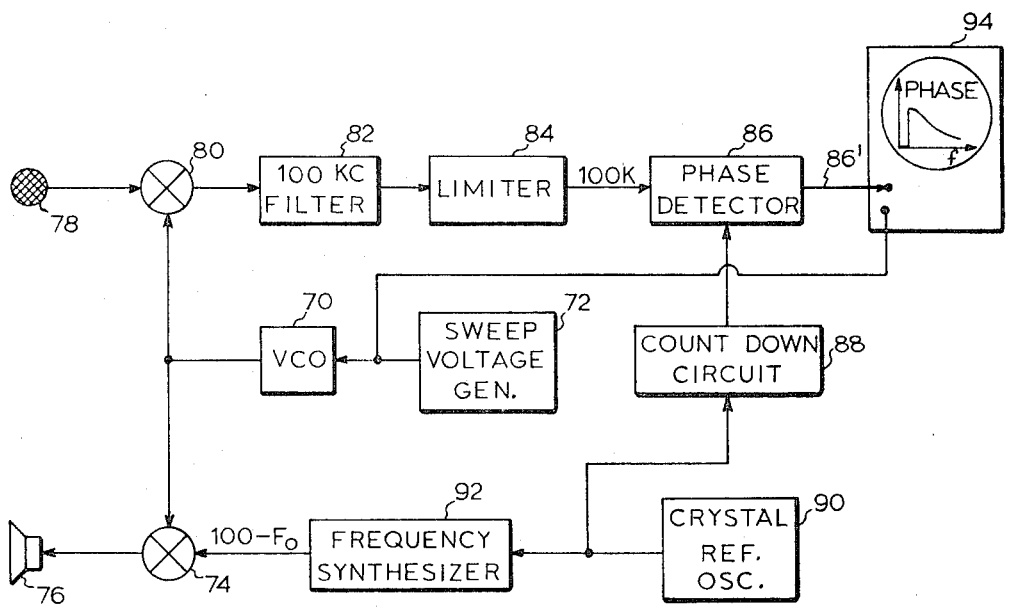
FIGURE 4 is a block diagram of a time delay spectrometer constructed in accordance with the invention which indicates phase delay at various frequencies.

FIGURE 4 illustrates apparatus for accurately measuring the phase shift of radiation from a body. The apparatus is similar to the apparatus of FIGURE 3 in that it contains a VCO 70 which is driven by a sweep voltage generator 72. The VCO output is modulated by a constant frequency signal in a mixer 74, whose output is delivered to a loudspeaker 76. The loudspeaker radiates sound which reaches a microphone 78, and the microphone output is delivered to another mixer 80. The second mixer modulates the microphone output with the VCO output, and the difference passes to a narrow band filter 82. The filter output can be used to measure the frequency response of a test object in the manner described above in connection with FIGURE 3, or it can be used to measure phase shift using the rest of the circuit of FIGURE 4.

In the circuit of FIGURE 4, the output of the narrow bandpass filter 82 is passed through a limiter 84 to remove amplitude variations. The limiter output is delivered to a phase detector 86 for detecting the phase difference between the transmitted and received radiation. The phase of the transmitted radiation is derived from a divider or countdown circuit 88 whose frequency is a fraction of the frequency of a crystal reference oscillator 90, and in a controlled phase relationship. The crystal oscillator output also is divided by a frequency synthesizer 92 to obtain the mixer signal which is delivered to the loudspeaker. The reason why the frequency synthesizer 92 is used is to enable the generation of any frequency within a range, with a very accurately controlled frequency and with a predetermined phase relationship to the crystal oscillator output.

The phase difference between the transmitted and received radiation is indicated by the output from the phase detector 86. The phase difference for any frequency within the band of transmitted frequencies (except for a small frequency band at the low end of each sweep, as described above) can be measured on an oscilloscope. The phase detector output 86' is delivered to the Y-axis input of an oscilloscope 94, whose X axis is swept by the output of the sweep voltage generator 72. The oscilloscope then displays the phase shift along the frequency band of transmitted frequencies.

As described above, the invention allows for the detection of radiation of known frequency from a particular object while rejecting radiation of the same frequency from other objects, by reason of the different path lengths. While this can be accomplished with a continually swept frequency, it can also be performed with radiation which repeatedly steps in frequency. In such a case, the filter can also step in frequency, or be swept. The problem with such an arrangement is that the radiation at any particular frequency has a starting transient. It requires an appreciable time for the starting transient to die down, and this time often may exceed the difference in time for different radiation path lengths in the testing environment. On the other hand, a continuously swept frequency (during sweep periods) generally eliminates transients, and better discrimination is possible.

The rate of frequency variation must be high enough so that radiations following substantially different paths, taking them to two different bodies in the environment, arrive at times when the filter is at two substantially different frequencies. The difference in center frequency of the filter passband at the different arrival times must be sufficient to exclude the unwanted radiation. The required difference depends upon the width of the filter passband. For example, for objects close enough to each other to provide a difference in path length of eight feet, and a filter of 140 Hz passband width for 6 db rejection, a sweep rate of 20 kHz per second will be sufficient. A passband approximately equal to the square foot of the sweep rate yields optimum special discrimination while retaining optimum frequency discrimination. For a greater frequency discrimination, i.e., to measure response at frequencies close to each other, a filter of narrower bandwidth must be used, together with a lower sweep rate. This reduces the ability to discriminate against objects close to the desired object, i.e., spacial discrimination. Alternatively, spacial discrimination can be increased at the cost of frequency discrimination.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for time delay spectrometry comprising:
transmitting means for transmitting radiation which varies in frequency with time;
receiving means for receiving said radiation;
means coupled to said transmitting and receiving means for indicating the amplitude of frequency components of radiation received by said receiving means which have a frequency equal to the frequency of said radiation at said transmitting means at a predetermined previous time; and
means responsive to the instantaneous frequency of radiation transmitted by said transmitting means for indicating the relationship between the amplitudes of said frequency components and the frequency of said rotation;

2. Apparaatus as defined in claim 1 wherein:
said transmitting means comprises means for varying the frequency of said radiation substantially continuously during sweep periods, whereby to avoid transient signals.

3. Apparatus as defined in claim 1 wherein:
said transmitting means comprises a sweep frequency oscillator for generating a signal whose frequency varies substantially at a constant rate during sweep intervals and a transducer driven by the output of said oscillator; and
said means for detecting comprises tunable filter means coupled to said receiving means, and means coupled to said oscillator for controlling the passband frequency of said filter means.

4. Apparatus as defined in claim 1 wherein:
said transmitting means comprises a sweep frequency oscillator whose output varies at a substantially constant rate during sweep intervals; and,
said means for detecting frequency components comprising:
modulator means having a first input coupled to said receiving means, a second input coupled to said transmitting means for receiving signals of a frequency which varies at the same rate as the frequency of transmitted signals during at least a portion of said sweep intervals, and an output; and
a narrow passband filter coupled to said output of said modulator means.

5. Apparatus for measuring the amplitude of radiation from a first body, independently of radiation of the same frequency from another body, comprising:
means for energizing said first body to produce radiation which continuously varies in frequency during predetermined intervals;
radiation detecting means spaced from said bodies for detecting, at each instant, substantially only the components of said radiation which have a frequency equal to the frequency of radiation emerging from said first body at a time which is previous by a period equal to the time required for said radiation to traverse the distance between said first body and said detecting means; and
means coupled to said radiation detecting means for indicating substantially the relationship between the amplitude of said components detected by said detecting means and their frequency.

6. Apparatus as defined in claim 5 wherein:
said means for energizing comprises means spaced a predetermined distance from said first body for generating radiation; and
said radiation detecting means comprises transducer means for converting radiation passing a particular area into electrical signals, tunable filter means coupled to said means for energizing for passing only frequency components representing the frequency of said radiation at said first body at a time which is previous by a period substantially equal to said time required for said radiation to traverse the distance between said means for generating radiation and said first body plus the time required for said radiation to traverse the distance between said first body and said detecting means, and means for indicating the amplitude of said frequency components.

7. Apparatus as defined in claim 5 wherein:
said means for energizing includes means for varying said frequency at a constant rate; and
said radiation detecting means comprises filter means coupled to said means for generating to pass only components of received radiation having a frequency which differs from the frequency of said radiation at said means for energizing by a predetermined difference frequency, and means for indicating the amplitude of components of said difference frequency.

8. A method for indicating the radiation characteristics of an object in an environment of other bodies which can radiate comprising:
applying radiation which varies rapidly in frequency, to said object;
detecting radiation at a point spaced from said object; and
filtering said detected radiation to determine the amplitude of only the components having a frequency equal to the frequency of radiation at said object at a predetermined time previous to its detection.

9. A method as defined in claim 8, including:
indicating the relationship between the amplitude of said components in said detected radiation and the frequency of radiation at said object which produced those components.

10. A method as defined in claim 8, including:
indicating the phase relationship between said component in said detected radiation and the phase of said applied radiation.

11. Apparatus for time delay spectrometry comprising:
transmitting means for transmitting radiation which varies in frequency with time;
receiving means for receiving said radiation; and
means coupled to said transmitting and receiving means responsive to frequency components of radiation received by said receiving means which have a frequency equal to the frequency of said radiation at said transmitting means at a predetermined previous time, for indicating the phase shift between said frequency components and said radiation at said transmitting means at a predetermined previous time.

12. Apparatus for time delay spectrometry comprising:
transmitting means including:
 means for generating a sweep signal which varies linearly with time,
 means for generating an offset signal of constant offset frequency,
 a mixer for mixing said sweep and offset signals, and
 means for transmitting an output of said mixer;
receiving means for receiving said output transmitted by said means for transmitting; and
means coupled to said transmitting and reeciving means including:
 modulator means for modulating signals from said receiving means with signals from said transmitting means which vary at the same rate as said sweep signal,
 band pass filter means coupled to said modulator means for passing a particular freqeuncy, and
 phase detection means coupled to the output of said band pass filter means and said means for generating an offset signal, for generating a signal indicating the phase difference between the output of said band pass filter means and a signal derived from said offset signal.

13. Apparatus for measuring the amplitude of radiation from transducer means, independently of radiation of the same frequency from another body, comprising:
means for generating an electrical signal which varies in frequency with time;
means for applying said electrical signal to said transducer means; and
radiation detecting means spaced from said transducer means and said another body for detecting substantially only the components of said radiation which have a frequency equal to the frequency of radiation emerging from said transducer means at a time which is previous by a period equal to the time required for said radiation to traverse the distance between said tarnsducer means and said detecting means.

14. Apparatus for measuring the response characteristics of a body comprising:
a variable frequency oscillator, including means for sweeping its frequency along a band of frequencies at a predetermined constant rate with respect to time;
means for applying the output of said oscillator to said body to cause the emanation of radiation from said body;
transducer means for detecting said radiation;
modulator means for modulating the output from said transducer with a signal which varies at said predetermined constant rate;
pass band filter means coupled to said modulator means for passing frequency components of a particular frequency; and
means coupled to said filter means and said oscillator means for indicating the relationship between the frequency of said radiation which was applied to said body at a predetermined instant and the amplitude of said frequency components, whereby to obtain the amplitude response of said body at various frequencies.

15. Apparatus for time delay spectrometry comprising:
first oscillator means for generating signals which vary in frequency at a constant rate during predetermined periods;
second oscillator means for generating a signal which has a constant frequency;
first mixing means for mixing the outputs of said first and second oscillator means to obtain a signal for radiating which is offset in frequency from the output of said first oscillator means by a predetermined frequency dependent upon the output of said second oscillator means;
second mixing means for mixing detected radiation signals with the output of said first oscillator means;
filter means coupled to said mixing means for passing only components of a predetermined frequency;
means coupled to said second oscillator means for deriving a signal having a frequency which is a precisely constant multiple of the freqeuncy delivered by second oscillator means to said first mixing means; and
phase detection means for indicating the phase between said components from said filter means and the signal from said means for deriving a signal.

References Cited
UNITED STATES PATENTS

| | | | |
|---|---|---|---|
| 2,553,907 | 5/1951 | Fleming-Williams et al. | 343—14 |
| 3,016,513 | 1/1962 | Van Dyke | 340—3 |
| 3,343,167 | 9/1967 | Rademacher | 343—17.5 |

RODNEY D. BENNETT, JR., Primary Examiner

M. F. HUBLER, Assistant Examiner

U.S. Cl. X.R.

340—3; 343—17.5

UNITED STATES PATENT OFFICE
CERTIFICATE OF CORRECTION

Patent No. 3,466,652  Dated September 9, 1969

Inventor(s) Richard C. Heyser

It is certified that error appears in the above-identified patent and that said Letters Patent are hereby corrected as shown below:

Column 1, line 27, "rejection" should read -- reject --. Column 5, line 63, "to" should read -- of --. Column 7, line 24, "lengths" should read -- length --; line 49, "foot" should read -- root --; line 50, "special" should read -- spacial --. Column 8, line 5, "rotation" should read -- radiation --. Column 9, lines 24-25 "component" should read -- components --; line 53, "reeciving" should read -- receiving --; line 60, "freqeuncy" should read -- frequency --. Column 10, line 10, "tarnsducer" should read -- transducer --; line 56, before "second" insert -- said --.

Signed and sealed this 7th day of November 1972.

(SEAL)
Attest:

EDWARD M. FLETCHER, JR.
Attesting Officer

ROBERT GOTTSCHALK
Commissioner of Patents